(12) United States Patent
Gu et al.

(10) Patent No.: US 10,549,590 B2
(45) Date of Patent: Feb. 4, 2020

(54) ASSEMBLY COMPRISING A TOWING HOOK ORIFICE COVERING PLATE AND A SKIN

(71) Applicants: COMPAGNIE PLASTIC OMNIUM, Lyons (FR); YANFENG PLASTIC OMNIUM AUTOMOTIVE EXTERIOR SYSTEMS CO., LTD., Shanghai (CN)

(72) Inventors: Fang Gu, Shanghai (CN); Zhongyu Ma, Shanghai (CN)

(73) Assignees: COMPAGNIE PLASTIC OMNIUM, Lyons (FR); YANFENG PLASTIC OMNIUM AUTOMOTIVE EXTERIOR SYSTEMS CO., LTD., Shanghai (CN)

( * ) Notice: Subject to any disclaimer, the term of this patent is extended or adjusted under 35 U.S.C. 154(b) by 230 days.

(21) Appl. No.: 15/531,033

(22) PCT Filed: Nov. 26, 2015

(86) PCT No.: PCT/CN2015/095676
§ 371 (c)(1),
(2) Date: May 26, 2017

(87) PCT Pub. No.: WO2016/082778
PCT Pub. Date: Jun. 2, 2016

(65) Prior Publication Data
US 2017/0313146 A1    Nov. 2, 2017

(30) Foreign Application Priority Data

Nov. 26, 2014  (CN) .......................... 2014 1 0696709

(51) Int. Cl.
*B60D 1/60*    (2006.01)
*B60D 1/56*    (2006.01)

(52) U.S. Cl.
CPC .............. *B60D 1/60* (2013.01); *B60D 1/565* (2013.01)

(58) Field of Classification Search
CPC .................................. B60D 1/60; B60D 1/565
(Continued)

(56) References Cited

U.S. PATENT DOCUMENTS 9,004,583 B2    4/2015  Takahashi et al.
2012/0292930 A1*  11/2012  Hermanson ............ B60D 1/565
                                                     293/102
2014/0183884 A1*  7/2014  Takahashi ............... B60R 13/10
                                                     293/117

FOREIGN PATENT DOCUMENTS

CN          201685672 U    12/2010
CN          102555707 A     7/2012
(Continued)

OTHER PUBLICATIONS

International Search Report in PCT/CN2015/095676 dated Mar. 1, 2016, 4 pages.
(Continued)

*Primary Examiner* — Joseph D. Pape
*Assistant Examiner* — Dana D Ivey
(74) *Attorney, Agent, or Firm* — Metis IP LLC

(57) ABSTRACT

An assembly is provided. The assembly comprises a towing hook orifice covering plate (10) and a skin (20), wherein the towing hook orifice covering plate comprises a covering plate modeling surface (10*a*) facing the outside of a bumper and a covering plate structural surface (10*b*) facing the inside of the bumper. The covering plate structural surface has oppositely arranged rotary lugs (13*a*, 13*b*) that are perpendicular to the covering plate structural surface and extend therefrom, and the rotary lugs have arc surfaces (131*a*, 131*b*) away from the covering plate structural surface. The skin (2) has grooves (21*a*, 21 *b*) for accommodating the rotary lugs, and the grooves comprise first arc sections (211*a*, 211*b*), linear sections (212*a*, 212*b*) and second arc sections (213*a*, 213*b*), wherein the linear sections are located between the first arc sections and the second arc sections. The assembly has a rotating axis defined by the rotary lugs and solves the interference problem in the prior art by changing the position of the rotating axis. The
(Continued)

assembly maintains the vehicle outlook by not changing the appearance of the covering plate modeling surface, and can satisfy the requirements for the opening of the towing hook orifice covering plate and for the gap between the towing hook orifice covering plate and the skin.

16 Claims, 8 Drawing Sheets

(58) Field of Classification Search
USPC ........................................................ 293/102
See application file for complete search history.

(56) References Cited

FOREIGN PATENT DOCUMENTS

| CN | 202608489 U | 12/2012 |
|---|---|---|
| CN | 203126425 U | 8/2013 |
| CN | 203472444 U | 3/2014 |
| CN | 104442243 A | 3/2015 |
| CN | 204249759 U | 4/2015 |
| DE | 102012019646 A1 | 4/2014 |
| JP | 2004175190 A | 6/2004 |
| JP | 2007186026 A | 7/2007 |
| KR | 20110019923 A | 3/2011 |

OTHER PUBLICATIONS

Written Opinion in PCT/CN2015/095676 dated Mar. 1, 2016, 5 pages.
First Office Action in Chinese Application No. 201410696709.X dated Jan. 29, 2016, 10 pages.
The Extended European Search Report in European Application No. 15863778.5 dated Jul. 13, 2018, 7 pages.

* cited by examiner

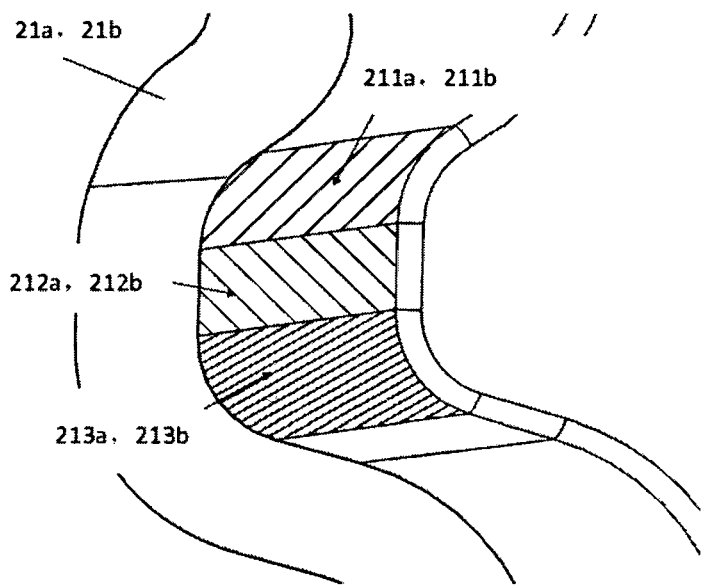
Fig. 10
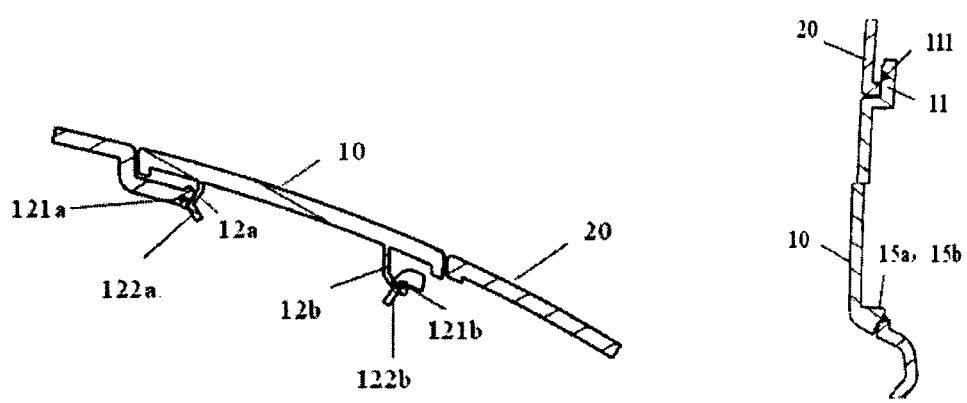
Fig. 11A
Fig. 11B

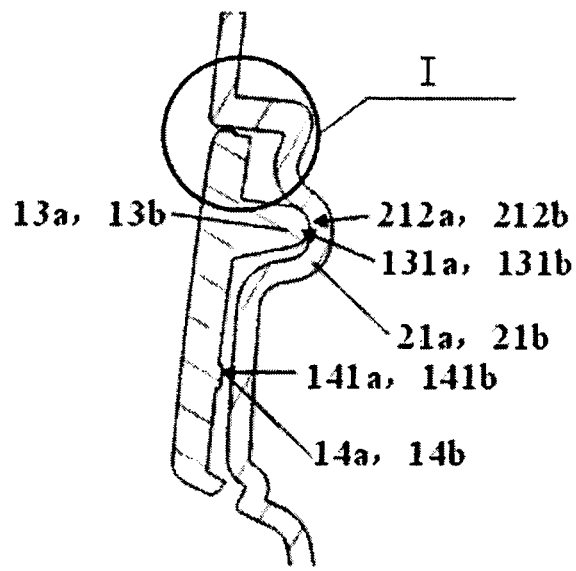
Fig. 12C
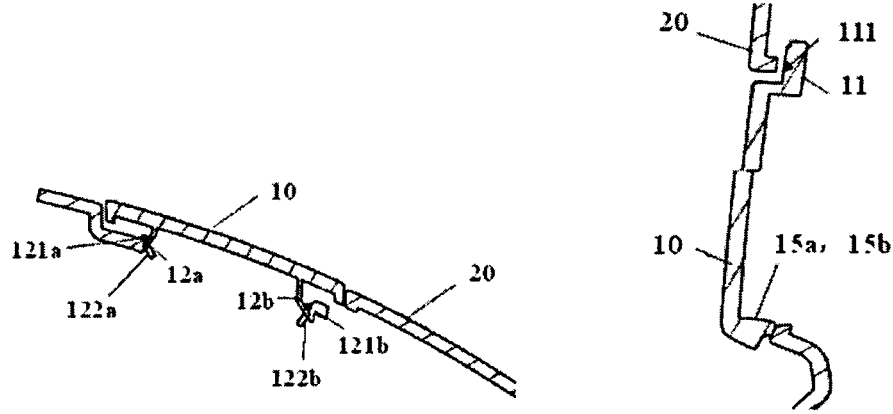
Fig. 13A
Fig. 13B

US 10,549,590 B2

ASSEMBLY COMPRISING A TOWING HOOK ORIFICE COVERING PLATE AND A SKIN

CROSS-REFERENCE TO RELATED APPLICATIONS

This present application is a U.S. national stage under 35 U.S.C. § 371 of International Application No. PCT/CN2015/095676, filed on Nov. 26, 2015, designating the United States of America, which claims priority of Chinese Patent Application No. 201410696709.X filed on Nov. 26, 2014, the entire contents of which are hereby incorporated by reference.

TECHNICAL FIELD

The present invention relates to a vehicle ornament, and more particularly to an assembly comprising a towing hook orifice covering plate and a skin.

BACKGROUND ART

There is always a covering plate provided for a vehicle bumper having a towing hook orifice. The covering plate not only facilitates vehicle towing, but also exists for the aesthetic sake, so it is desired to have a towing hook orifice covering plate that can be easily opened and better control the flush and gap with the bumper.

An existing towing hook orifice covering plate can have various structures, one of which is shown in FIG. 1. In this structure, an engagement part 101 and a snap 102 of the towing hook orifice covering plate 100 are engaged with the skin 200 (FIG. 2) so that the towing hook orifice covering plate 100 is blocked in closed position in which it covers towing hook orifice. The engagement part 101 corresponds to the opening end of the towing hook orifice covering plate 100. The towing hook orifice covering plate 100 has oppositely arranged rotary lugs 103a, 103b extending therefrom. The centers of the rotary lugs 103a and 103b define together a rotating axis. When the towing hook orifice covering plate 100 needs to be opened, a user has just to press the opening end to make the towing hook orifice covering plate 100 rotate around the rotating axis towards the inside of the bumper. The towing hook orifice covering plate 100 is opened when the snap 102 of the towing hook orifice covering plate 100 is disengaged from the skin. As shown in FIG. 2, the rotary lugs 103a, 103b of the towing hook orifice covering plate 100 are substantially semi-cylindrical in shape with their centers defining the rotating axis. The surfaces of the rotary lugs 103a, 103b at their free ends are rotatingly engaged with the inner surfaces of grooves 201a, 201b of the skin 200. Accordingly, the grooves 201a, 201b are also substantially semi-cylindrical. In the opening process of the towing hook orifice covering plate 100, interference will occur in zone I shown in the drawings as the towing hook orifice covering plate 100 rotates around the rotating axis towards the inside of the bumper such that the towing hook orifice covering plate 100 cannot be opened smoothly by rotating further towards the inside of a bumper.

SUMMARY OF THE INVENTION

To solve the problem in the prior art of difficulty of opening a towing hook orifice covering plate smoothly due to interference, the present invention provides an assembly comprising a towing hook orifice covering plate and a skin.

The present invention provides an assembly comprising a towing hook orifice covering plate and a skin, wherein the towing hook orifice covering plate comprises a covering plate modeling surface facing the outside of a bumper and a covering plate structural surface facing the inside of the bumper, the covering plate structural surface has oppositely arranged rotary lugs that are perpendicular to the covering plate structural surface and extend therefrom, the rotary lugs have arc surfaces away from the covering plate structural surface; the skin has grooves for accommodating the rotary lugs, the grooves comprise first arc sections, linear sections and second arc sections, wherein the linear sections are located between the first arc sections and the second arc sections.

More generally, the present invention provides an assembly comprising a towing hook orifice covering plate and a skin, the towing hook orifice covering plate comprising a covering plate modeling surface facing the outside of a bumper and a covering plate structural surface facing the inside of the bumper, the covering plate structural surface being provided with oppositely arranged rotary lugs, protruding from the covering plate structural surface, the rotary lugs comprising a curved surface allowing rotation of the covering plate relative to the skin, wherein the skin comprises grooves for receiving the rotary lugs, and the rotary lugs are shaped so that they are capable of rotating and sliding in the grooves, for example vertically sliding in the grooves. Preferably, the sliding is a translation in a direction other than the direction of a rotating axis defined by the rotary lugs, preferably in a perpendicular direction.

As a result, the interference problem in the prior art can be solved by allowing the rotary lugs to both rotate and slide. Thanks to the sliding, they can translate so that there is more space for the covering plate to rotate towards the inside of the bumper. Preferably, the rotary lugs can change their vertical position. It should be understood that a curved surface can be an arc surface, that is to say a semi-circular surface, but not necessary, it can be any curved, bent or cambered surface, allowing rotation of the rotary lugs relative to the grooves of the skin.

The assembly device may also include at least one of the following characteristics, taken alone or in combination.

The grooves comprise a first curved section and a second curved section, the rotary lugs defining a rotating axis movable between a first position, when they are engaged with the first curved section, and a second position, when the rotary lugs are engaged with the second curved section, the first and second positions of the rotating axis being spaced one to another, preferably vertically spaced one to another. It should be understood that the first position of the rotating axis corresponds to a position when the rotary lugs are in contact with the first curved section and the second position of the rotating axis corresponds to a position when the rotary lugs are in contact with the second curved section.

The grooves comprise a first curved section, a linear section and a second curved section, wherein the linear section is disposed between the first arc section and the second arc section.

The curved surface of the rotary lugs is an arc surface and/or the first curved section is a first arc section and/or the second curved section is a second arc section. In other words in this case, the curved surface and/or sections have a semi-circular shape.

The towing hook orifice covering plate comprises an engagement part for engaging the skin. Preferably the engagement part extends from the covering plate structural surface towards outside, is L-shaped and is provided with a first engagement surface facing the covering plate structural surface and a second engagement surface perpendicular to the covering plate structural surface and facing outside.

The first engagement surface has positioning ribs extending therefrom towards the covering plate structural surface.

The towing hook orifice covering plate has a snap for engaging the skin, preferably two snaps, that extend from the covering plate structural surface with each snap having a snap surface extending from the covering plate structural surface and a guiding surface extending from the snap surface to a free end.

The snap surface and the guiding surface intersect to form an obtuse angle.

The towing hook orifice covering plate comprises a spacing lug, are perpendicular to the covering plate structural surface and extending therefrom, preferably two oppositely arranged spacing lugs, each spacing lug being provided with top surfaces parallel to the covering plate structural surface.

The towing hook orifice covering plate has protrusions that are perpendicular to the covering plate structural surface and extend therefrom.

The towing hook orifice covering plate has an arrow-like anti-drop component that extends from the periphery of the covering plate structural surface.

It can be understood that when the arc (or curved) surfaces of the rotary lugs of the towing hook orifice covering plate of the present invention are engaged with the first arc (or curved) section of the grooves of the skin, the rotary lugs define a rotating axis in a first position; and when the arc (or curved) surfaces of the rotary lugs of the towing hook orifice covering plate of the present invention are engaged with the second arc (or curved) sections of the grooves of the skin, the rotary lugs define the rotating axis in a second position. As a result, the interference problem in the prior art can be solved by changing the position of the rotating axis, through its sliding. The assembly of the present invention maintains the vehicle outlook by not changing the appearance of the covering plate modeling surface, and can satisfy the requirements for the opening of the towing hook orifice covering plate and for the gap between the towing hook orifice covering plate and the skin. All in all, the assembly comprising the towing hook orifice covering plate and the skin of the present invention has a simple structure and a low cost, and meanwhile meets the requirements for vehicle outlook and safety.

BRIEF DESCRIPTION OF THE DRAWINGS

FIG. 10 is an enlarged view of a groove of the skin according to the present invention;

FIG. 11A is a cross-sectional view of the assembly comprising the towing hook orifice covering plate and the skin according to the present invention taken along the line A-A in FIG. 3, which is in the first state;

FIG. 11B is a cross-sectional view of the assembly comprising the towing hook orifice covering plate and the skin according to the present invention taken along the line B-B in FIG. 3, which is in the first state;

FIG. 12C is a cross-sectional view of the assembly comprising the towing hook orifice covering plate and the skin according to the present invention taken along the line C-C in FIG. 3, which is in the second state;

FIG. 13A is a cross-sectional view of the assembly comprising the towing hook orifice covering plate and the skin according to the present invention taken along the line A-A in FIG. 3, which is in the third state;

FIG. 13B is a cross-sectional view of the assembly comprising the towing hook orifice covering plate and the skin according to the present invention taken along the line B-B in FIG. 3, which is in the third state;

DETAILED DESCRIPTION OF THE PREFERRED EMBODIMENTS

The present invention will be described in detail with reference to the following drawings and in combination with the preferred embodiments of the present invention.

Figure 1:
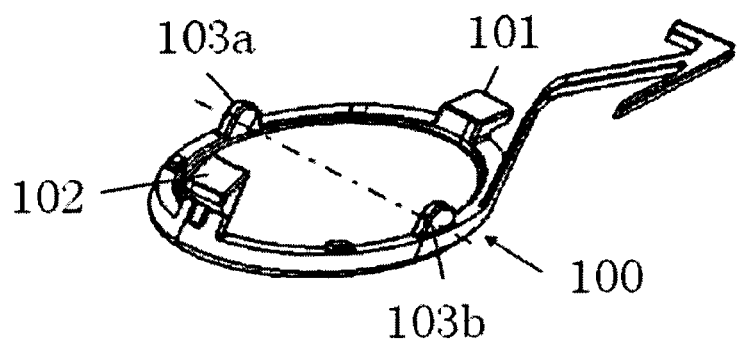
FIG. 1 is a perspective view of a towing hook orifice covering plate in the prior art.
Figure 2:
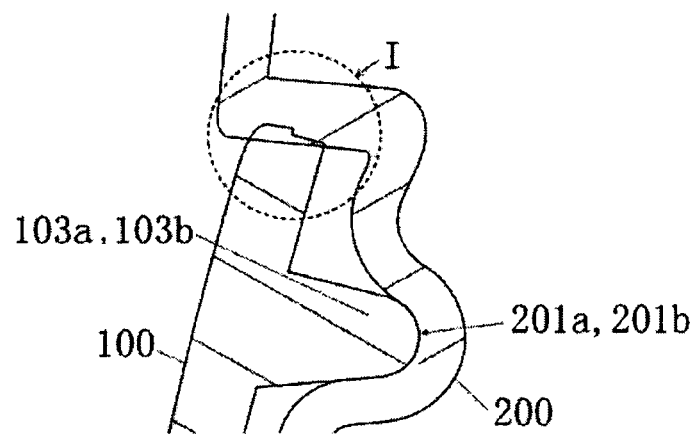
FIG. 2 is a partial enlarged view of an assembly comprising the towing hook orifice covering plate and a skin in the prior art, which has an interference problem during its opening process.
Figure 3:
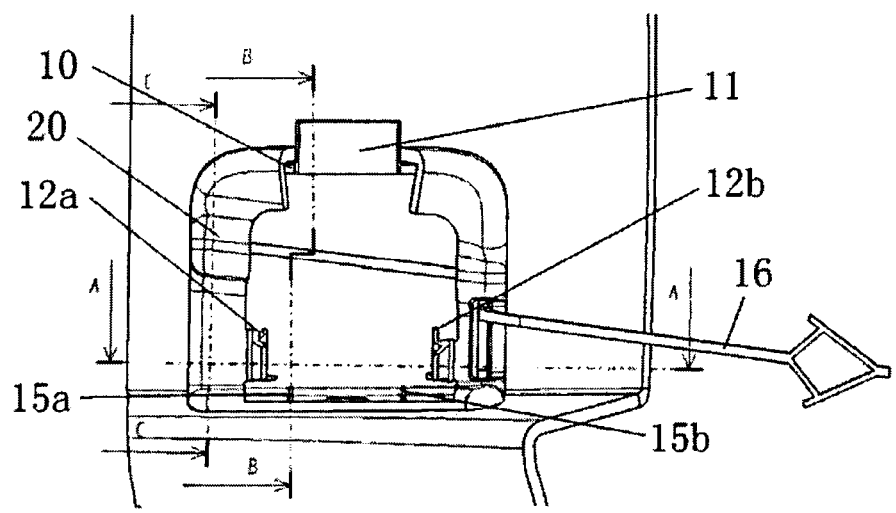
FIG. 3 is a perspective view of the assembly comprising the towing hook orifice covering plate and the skin according to the present invention.

FIG. 3 shows an assembly comprising a towing hook orifice covering plate 10 and a skin 20 according to a preferred embodiment of the present invention. An engagement part 11, snaps 12a, 12b and protrusions 15a, 15b of the towing hook orifice covering plate 10 are engaged with the skin 20 so that the towing hook orifice covering plate in a closed position is stationary with respect to the skin. When the towing hook orifice covering plate 10 needs to be opened, the engagement part 11 corresponds to the opening end of the towing hook orifice covering plate 10, which is pressed such that the towing hook orifice covering plate 10 rotates around a rotating axis towards the inside of a bumper (rotating towards the inside of the paper), and the towing hook orifice covering plate 10 is opened when the snaps 12a, 12b of the towing hook orifice covering plate 10 are fully disengaged from the skin 20.

Figure 4A:
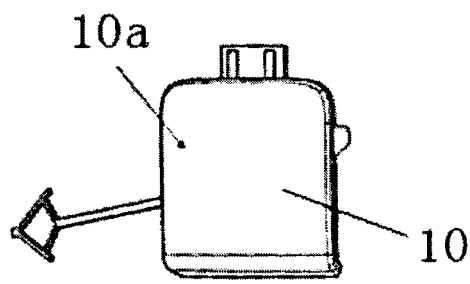
FIG. 4A shows the modeling surface of the towing hook orifice covering plate according to the present invention.
Figure 4B:
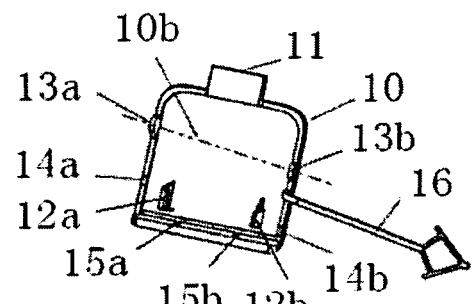
FIG. 4B shows the structural surface of the towing hook orifice covering plate according to the present invention.
Figure 5:
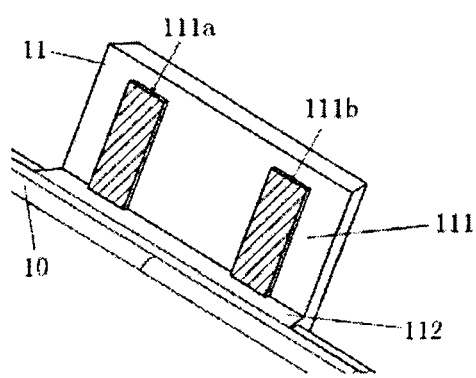
FIG. 5 is an enlarged view of an engagement part of the towing hook orifice covering plate according to the present invention.
Figure 6:
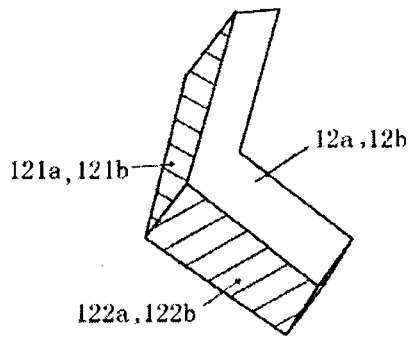
FIG. 6 is an enlarged view of a snap of the towing hook orifice covering plate according to the present invention.
Figure 7:
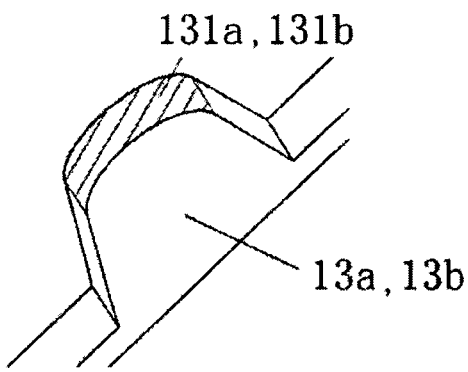
FIG. 7 is an enlarged view of a rotary lug of the towing hook orifice covering plate according to the present invention.
Figure 8:
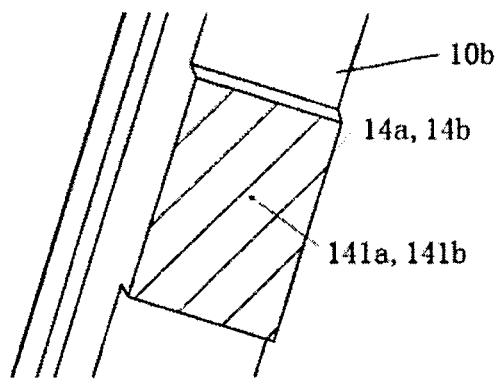
FIG. 8 is an enlarged view of a spacing lug of the towing hook orifice covering plate according to the present invention.
Figure 9A:
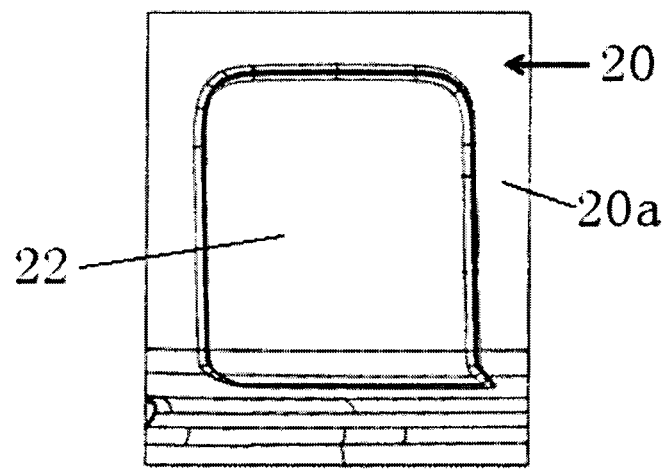
FIG. 9A shows a modeling surface of the skin according to the present invention.
Figure 9B:
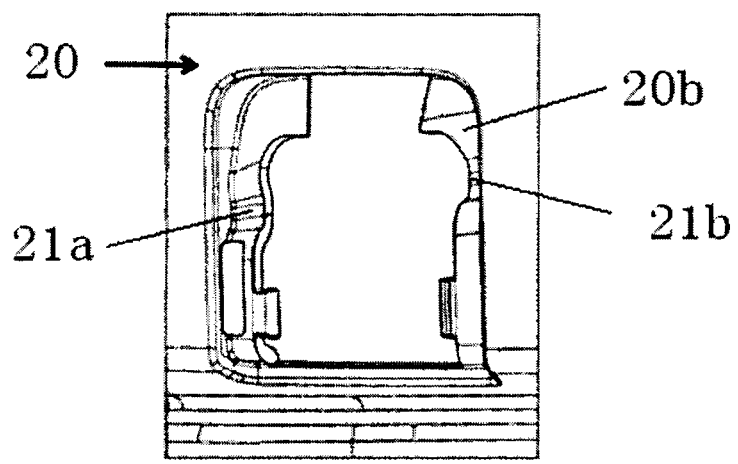
FIG. 9B shows a structural surface of the skin according to the present invention.

FIG. 4A shows a modeling surface 10a of the towing hook orifice covering plate according to the present invention, whereas FIG. 4B shows a structural surface 10b of the towing hook orifice covering plate according to the present invention. The towing hook orifice covering plate 10 is shown as a rectangular covering plate, wherein the covering plate modeling surface 10a faces the outside of the bumper and the covering plate structural surface 10b faces the inside of the bumper. The towing hook orifice covering plate 10 has the engagement part 11 extending from the covering plate structural surface 10b towards outside, and the engagement part 11 is L-shaped and has a first engagement surface 111 facing the covering plate structural surface 10b and a second engagement surface 112 perpendicular to the covering plate structural surface 10b and facing outside, as shown in FIG. 5. The first engagement surface 111 has positioning ribs 111a, 111b extending therefrom towards the covering plate structural surface 10b in order to facilitate the control of flush and gap between the towing hook orifice covering plate 10 and the skin. The towing hook orifice covering plate 10 has two snaps 12a, 12b extending from the covering plate structural surface 10b with the snaps 12a, 12b each having snap surfaces 121a, 121b engaging the skin and extending from the covering plate structural surface 10b and guiding surfaces 122a, 122b extending from the snap surfaces 121a, 121b to a free end, as shown in FIG. 6. The snap surfaces 121a, 121b and the guiding surfaces 122a, 122b intersect to form an obtuse angle, thereby engaging the skin according to the shape of the corresponding portion of the skin and engagement requirements. The covering plate structural surface 10b has oppositely arranged rotary lugs 13a, 13b that protrude from, more precisely are perpendicular to, the covering plate structural surface 10b and extend therefrom. The rotary lugs 13a, 13b have curved surfaces 131a, 131b allowing rotation of the covering plate 10 relative to the skin 20. More precisely, curved surfaces 131a, 131b are arc surfaces remote from the covering plate structural surface as shown in FIG. 7, and the arc surfaces 131a, 131b are engaged with corresponding grooves of the skin 20. The center of the curve or circle defined by the arc surfaces 131a, 131b of the rotary lugs 13a, 13b corresponds to the rotating axis of the towing hook orifice covering plate. Further, the towing hook orifice covering plate 10 has oppositely arranged spacing lugs 14a, 14b that are perpendicular to the covering plate structural surface 10b and extend therefrom, and the spacing lugs 14a, 14b have top surfaces 141a, 141b parallel to the covering plate structural surface 10b, as shown in FIG. 8. With reference to FIG. 3, the towing hook orifice covering plate 10 has protrusions 15a, 15b that are perpendicular to the covering plate structural surface 10band extend therefrom, which are used to limit the position of the towing hook orifice covering plate 10. With reference to FIG. 4B, the towing hook orifice covering plate 10 has an arrow-like anti-drop component 16 that extends from the periphery of the covering plate structural surface 10b, which is shown to be located between the rotary lugs 13a, 13b and the spacing lugs 14a, 14B so as to prevent the towing hook orifice covering plate, once opened, from slipping off the vehicle or avoid the loss thereof. FIG. 9A shows a modeling surface 20a of the skin according to the present invention, whereas FIG. 9B shows a structural surface 20b of the skin according to the present invention. The skin structural surface 20b refers to a profile surface structurally engaged with the towing hook orifice covering plate 10, and all the rest is called the skin modeling surface 20a. The modeling surface 20a has a through hole 22 for accommodating the towing hook orifice covering plate 10 therein, and the skin structural surface 20b has grooves 21a, 21b for accommodating the rotary lugs 13a, 13b, as shown in FIG. 10. The grooves 21a, 12b include first curved sections 211a, 211b, which are arc sections, linear sections 212a, 212b and second curved sections 213a, 213b, which are arc sections. The linear sections 212a, 212b are located between the first arc sections 211a, 211b and the second arc sections 213a, 213b. When the arc surfaces 131a, 131b of the rotary lugs 13a, 13b of the towing hook orifice covering plate 10 are engaged with the first arc sections 211a, 211b of the grooves 21a, 21b of the skin 20, the rotary lugs 13a, 13b define the rotating axis in the first position; and when the arc surfaces 131a, 131b of the rotary lugs 13a, 13b of the towing hook orifice covering plate 10 is engaged with the second arc sections 213a, 213b of the grooves 21a, 21b of the skin 20, the rotary lugs 13a, 13b define the rotating axis in the second position. As a result, the interference problem in the prior art can be solved by changing the position of the rotating axis, through sliding in vertical direction in this example.

Figure 11C:
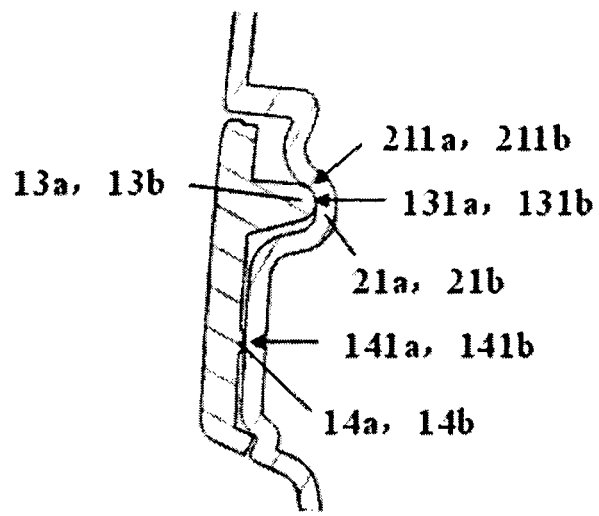
FIG. 11C is a cross-sectional view of the assembly comprising the towing hook orifice covering plate and the skin according to the present invention taken along the line C-C in FIG. 3, which is in the first state.

The cross-sectional views showing the engagement of the assembly comprising the towing hook orifice covering plate and the skin of the present invention in various motion states will be explained in detail with reference to the drawings. FIGS. 11A to 11C are cross-sectional views of the assembly comprising the towing hook orifice covering plate and the skin according to the present invention in the first state taken along the lines A-A, B-B and C-C in FIG. 3 respectively. The first state herein corresponds to a closed state. With reference to FIG. 11A, the snap surfaces 121a, 121b of the snaps 12a, 12b of the towing hook orifice covering plate 10 are engaged with the skin 20, and guiding surfaces 122a, 122b of the snaps 12a, 12b perform a guiding function during the opening and closing process. With reference to FIG. 11B, a first engagement surface 111 of the engagement part 11 of the towing hook orifice covering plate 10 is engaged with the skin, and protrusions 15a, 15b of the towing hook orifice covering plate 10 are engaged with the skin, to thereby prevent the towing hook orifice covering plate 10 in the position as shown from moving left and to control the flush and gap between the towing hook orifice covering plate 10 and the skin 20. With reference to FIG. 11C, the arc surfaces 131a, 131b of the rotary lugs 13a, 13b of the towing hook orifice covering plate 10 are engaged with the first arc sections 211a, 211b of the grooves 21a, 21b of the skin 20, and the top surfaces 141a, 141b of the spacing lugs 14a, 14b are engaged with the skin 20, to thereby control the flush and gap between the towing hook orifice covering plate 10 and the skin 20.

Figure 12A:
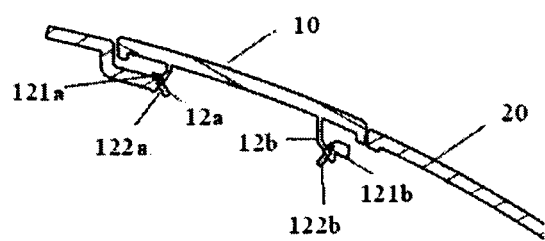
FIG. 12A is a cross-sectional view of the assembly comprising the towing hook orifice covering plate and the skin according to the present invention taken along the line A-A in FIG. 3, which is in the second state.
Figure 12B:
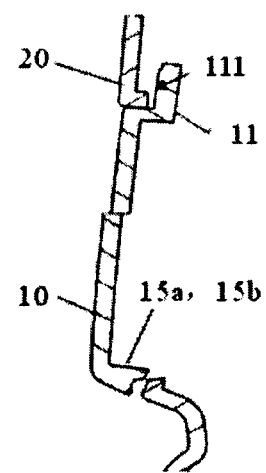
FIG. 12B is a cross-sectional view of the assembly comprising the towing hook orifice covering plate and the skin according to the present invention taken along the line B-B in FIG. 3, which is in the second state.

FIGS. 12A to 12C are cross-sectional views of the assembly comprising the towing hook orifice covering plate and the skin according to the present invention in the second state taken along the lines A-A, B-B and C-C in FIG. 3 respectively. The second state herein corresponds to an initial opened state. Press the opening end so that the towing hook orifice covering plate 10 rotates around the rotating axis in the first position towards inside the bumper. With reference to FIG. 12A, the snap surfaces 121a, 121b of the snaps 12a, 12b of the towing hook orifice covering plate 10 start to be disengaged from the skin 20. With reference to FIG. 12B, the first engagement surface 111 of the engagement part 11 of the towing hook orifice covering plate 10 and the protrusions 15a, 15b are disengaged from the skin. With reference to FIG. 12C, the arc surfaces 131a, 131b of the rotary lugs 13a, 13b of the towing hook orifice covering plate 10 are rotatingly engaged with the first arc sections 211a, 211b of the grooves 21a, 21b of the skin 20, and the top surfaces 141a, 141b of the spacing lugs 14a, 14b are disengaged from the skin 20. Zone I as shown corresponds to Zone I in the prior art, in which no interference occurs during the process.

Figure 13C:
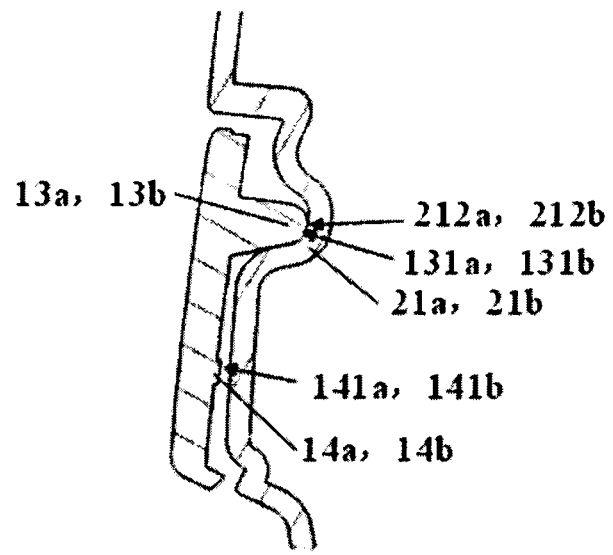
FIG. 13C is a cross-sectional view of the assembly comprising the towing hook orifice covering plate and the skin according to the present invention taken along the line C-C in FIG. 3, which is in the third state.

FIGS. 13A to 13C are cross-sectional views of the assembly comprising the towing hook orifice covering plate and the skin according to the present invention in the third state taken along the lines A-A, B-B and C-C in FIG. 3 respectively. The third state herein corresponds to a medium opened state. Press the opening end downwards to move the towing hook orifice covering plate 10 downwards. With reference to FIG. 13A, the snap surfaces 121a, 121b of the snaps 12a, 12b of the towing hook orifice covering plate 10 are still in partial contact with the skin 20. With reference to FIG. 13B, the first engagement surface 111 of the engagement part 11 of the towing hook orifice covering plate 10 and the protrusions 15a, 15b remain disengaged from the skin. With reference to FIG. 13C, the arc surfaces 131a, 131b of the rotary lugs 13a, 13b of the towing hook orifice covering plate 10 slide over the linear sections 212a, 212b of the grooves 21a, 21b of the skin 20, and the top surfaces 141a, 141b of the spacing lugs 14a, 14b remain disengaged from the skin 20. No interference occurs in Zone I during this process.

Figure 14A:
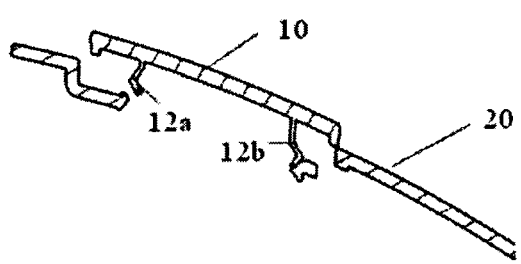
FIG. 14A is a cross-sectional view of the assembly comprising the towing hook orifice covering plate and the skin according to the present invention taken along the line A-A in FIG. 3, which is in the fourth state.
Figure 14B:
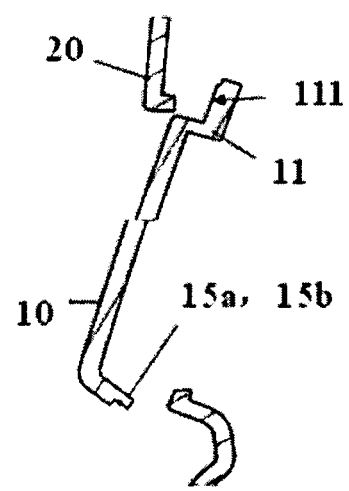
FIG. 14B is a cross-sectional view of the assembly comprising the towing hook orifice covering plate and the skin according to the present invention taken along the line B-B in FIG. 3, which is in the fourth state.
Figure 14C:
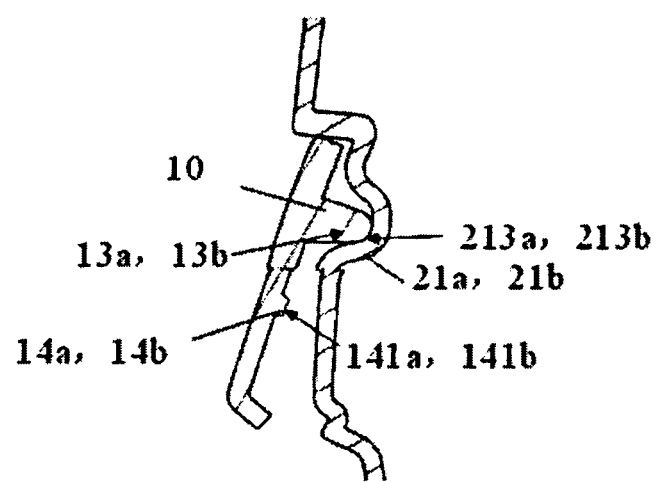
FIG. 14C is a cross-sectional view of the assembly comprising the towing hook orifice covering plate and the skin according to the present invention taken along the line C-C in FIG. 3, which is in the fourth state.

FIGS. 14A to 14C are cross-sectional views of the assembly comprising the towing hook orifice covering plate and the skin according to the present invention in the fourth state taken along the lines A-A, B-B and C-C in FIG. 3 respectively. The fourth state herein corresponds to a finished opened state. Go on pressing the opening end so that the towing hook orifice covering plate 10 rotates around the rotating axis in the second position towards the inside of the bumper. With reference to FIG. 14A, the snaps 12a, 12b of the towing hook orifice covering plate 10 are completely disengaged from the skin 20. With reference to FIG. 14B, the first engagement surface 111 of the engagement part 11 of the towing hook orifice covering plate 10 and the protrusions 15a, 15b are disengaged from the skin. With reference to FIG. 14C, the arc surfaces 131a, 131b of the rotary lugs 13a, 13b of the towing hook orifice covering plate 10 are slidingly and rotatingly engaged with the second arc sections 213a, 213bof the grooves 21a, 21b of the skin 20, and the top surfaces 141a, 141b of the spacing lugs 14a, 14b are further away from the skin 20. No interference occurs in Zone I during this process.

In such cases, the assembly comprising the towing hook orifice covering plate and the skin according to the present invention solves the interference problem in the prior art by changing the position of the rotating axis, and satisfies the opening requirements and controls the flush and gap between the towing hook orifice covering plate and the skin.

The above stated is only the preferred embodiments of the present invention, and not intended to limit the scope of the present invention. The above embodiments of the present invention may have variations. Any simple and equivalent variations and modifications made in light of the claims and the description of the present application for invention fall into the protection scope as claimed in the appended claims. Those that are not expounded herein shall be considered to be conventional technical contents.

The invention claimed is:

1. An assembly comprising a towing hook orifice covering plate (10) and a skin (20), the towing hook orifice covering plate (10) comprising a covering plate modeling surface (10a) facing the outside of a bumper and a covering plate structural surface (10b) facing the inside of the bumper, the covering plate structural surface (10b) being provided with oppositely arranged rotary lugs (13a, 13b), protruding from the covering plate structural surface (10b), the rotary lugs (13a, 13b) defining together a rotating axis and allowing rotation of the covering plate (10) relative to the skin (20) around the rotating axis, characterized in that the skin (20) comprises grooves (21a, 21b) for receiving the rotary lugs (13a, 13b), and the rotary lugs (13a, 13b) comprise a curved surface (131a, 131b) and the grooves (21a, 21b) are vertically shaped so that the rotary lugs are capable of rotating and sliding vertically in the grooves (21a, 21b).

2. The assembly according to claim 1, wherein the grooves (21a, 21b) comprise a first curved section (211a, 211b) and a second curved section (213a, 213b), the rotary lugs (13a, 13b) defining a rotating axis movable between a first position, when they are engaged with the first curved section (211a, 211b), and a second position, when the rotary lugs (13a, 13b) are engaged with the second curved section (213a, 213b), the first and second positions of the rotating axis being spaced one to another, preferably vertically spaced one to another.

3. The assembly according to claim 2, wherein the curved surface (131a, 131b) of the rotary lugs (13a, 13b) is an arc surface.

4. The assembly according to claim 2, wherein the first curved section (211a, 211b) is a first arc section.

5. The assembly according to claim 2, wherein the second curved section (213a, 213b) is a second arc section.

6. The assembly according to claim 1, wherein the grooves (21a, 21b) comprise a first curved section (211a, 211b), a linear section (212a, 212b) and a second curved section (213a, 213b), wherein the linear section (212a, 212b) is disposed between the first arc section (211a, 211b) and the second arc section (213a, 213b).

7. The assembly according to claim 6, wherein the curved surface (131a, 131b) of the rotary lugs (13a, 13b) is an arc surface.

8. The assembly according to claim 6, wherein the first curved section (211a, 211b) is a first arc section.

9. The assembly according to claim 6, wherein the second curved section (213a, 213b) is a second arc section.

10. The assembly according to claim 1, wherein the towing hook orifice covering plate (10) comprises an engagement part (11) for engaging the skin (20), preferably the engagement part (11) extending from the covering plate structural surface (10b) towards outside, being L-shaped and being provided with a first engagement surface (111) facing the covering plate structural surface (10b) and a second engagement surface (112), perpendicular to the covering plate structural surface (10b) and facing outside.

11. The assembly according to claim 10, wherein the first engagement surface (111) is provided with positioning ribs (111a, 111b) extending therefrom and towards the covering plate structural surface (10b).

12. The assembly according to claim 1, wherein the towing hook orifice covering plate (10) comprises a snap (12a, 12b) for engaging the skin (20), preferably two snaps, extending from the covering plate structural surface (10b), each snap (12a, 12b) comprising a snap surface (121a, 121b) extending from the covering plate structural surface (10b) and a guiding surface (122a, 122b) extending from the snap surface (121a, 121b) to a free end.

13. The assembly according to claim 12, wherein the snap surface (121a, 121b) and the guiding surface (122a, 122b) intersect to form an obtuse angle.

14. The assembly according to claim 1, wherein the towing hook orifice covering plate (10) comprises a spacing lug (14a, 14b), perpendicular to the covering plate structural surface (10b) and extending therefrom, preferably two oppositely arranged spacing lugs, each spacing lug (14a, 14b) being provided with top surface parallel to the covering plate structural surface (10b).

15. The assembly according to claim 1, wherein the towing hook orifice covering plate (10) comprises protrusions (15a, 15b), perpendicular to the covering plate structural surface (10b) and extending therefrom.

16. The assembly according to claim 1, wherein the towing hook orifice covering plate (10) comprises an arrow-like anti-drop element (16) extending from the periphery of the covering plate structural surface (10b).

* * * * *